(12) United States Patent
Wang et al.

(10) Patent No.: US 11,019,558 B2
(45) Date of Patent: May 25, 2021

(54) WIRELESS LOCAL AREA NETWORK ASSOCIATION METHOD AND DEVICE, AND CENTRAL ACCESS POINT

(71) Applicant: Huawei Technologies Co., Ltd., Shenzhen (CN)

(72) Inventors: Yungui Wang, Nanjing (CN); Lin Zhang, Suzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/792,293

(22) Filed: Oct. 24, 2017

(65) Prior Publication Data

US 2018/0115941 A1 Apr. 26, 2018

(30) Foreign Application Priority Data

Oct. 25, 2016 (CN) .......................... 201610940510.6

(51) Int. Cl.
*H04W 48/12* (2009.01)
*H04W 48/14* (2009.01)
(Continued)

(52) U.S. Cl.
CPC ........... *H04W 48/14* (2013.01); *H04W 48/16* (2013.01); *H04W 60/04* (2013.01); *H04W 76/10* (2018.02); *H04B 17/318* (2015.01); *H04W 84/12* (2013.01)

(58) Field of Classification Search
CPC ..... H04W 48/14; H04W 48/16; H04W 48/08; H04W 48/00; H04W 76/10; H04W 76/00;
(Continued)

(56) References Cited

U.S. PATENT DOCUMENTS 7,797,016 B2 * 9/2010 Eran .................. H04J 13/0048
370/310.2
9,319,202 B2 * 4/2016 Aboul-Magd .... H04W 28/0263
(Continued)

FOREIGN PATENT DOCUMENTS

CN 1689246 A 10/2005
CN 104221438 A 12/2014
(Continued)

OTHER PUBLICATIONS

Calhoun, P., Ed., et al.,"Control and Provisioning of Wireless Access Points (CAPWAP) Protocol Binding for IEEE 802.11," RFC 5416, Mar. 2009, 76 pages.
(Continued)

*Primary Examiner* — Jeffrey M Rutkowski
*Assistant Examiner* — Luna Weissberger
(74) *Attorney, Agent, or Firm* — Conley Rose, P.C.

(57) ABSTRACT

A wireless local area network (WLAN) association method and device and a central access point (AP), where the method includes receiving, by the central AP, a plurality of association requests, where the plurality of association requests are from at least two APs, and the plurality of association requests have a same basic service set identifier (BSSID), selecting, by the central AP, one association request from the plurality of association requests as a to-be-replied association request, and sending, by the central AP, a first association response to a to-be-associated AP, where the first association response is a reply to the to-be-replied association request, and the to-be-associated AP is an AP in the at least two APs that sends the to-be-replied association request. Only a to-be-associated AP provides a service for a terminal such that a possibility of conflict occurrence is reduced.

22 Claims, 6 Drawing Sheets

(51) Int. Cl.
  *H04W 48/16* (2009.01)
  *H04W 60/04* (2009.01)
  *H04W 76/10* (2018.01)
  *H04W 84/12* (2009.01)
  *H04B 17/318* (2015.01)

(58) Field of Classification Search
  CPC ..... H04W 60/04; H04W 60/00; H04W 84/12; H04W 84/10; H04W 84/02; H04B 17/318; H04B 17/309; H04B 17/30
  USPC .......................................................... 370/252
  See application file for complete search history.

(56) References Cited

U.S. PATENT DOCUMENTS

| | | | | |
|---|---|---|---|---|
| 9,433,022 | B2* | 8/2016 | Park | H04W 76/10 |
| 9,713,163 | B2* | 7/2017 | Ni | H04W 28/16 |
| 2003/0207699 | A1* | 11/2003 | Shpak | H04W 48/20 455/525 |
| 2004/0063455 | A1 | 4/2004 | Eran et al. | |
| 2007/0177549 | A1* | 8/2007 | Lo | H04W 36/0058 370/331 |
| 2007/0206537 | A1* | 9/2007 | Cam-Winget | H04W 12/06 370/331 |
| 2007/0230426 | A1* | 10/2007 | Beach | H04L 69/08 370/338 |
| 2010/0165968 | A1 | 7/2010 | Shpak | |
| 2015/0063153 | A1 | 3/2015 | Delagarrigue et al. | |
| 2016/0100440 | A1* | 4/2016 | Emord | H04W 76/18 370/329 |
| 2016/0353492 | A1 | 12/2016 | Park et al. | |
| 2018/0376423 | A1* | 12/2018 | Atefi | H04W 52/241 |
| 2019/0090153 | A1 | 3/2019 | Aboul-Magd et al. | |

FOREIGN PATENT DOCUMENTS

| | | | |
|---|---|---|---|
| CN | 104704753 | A | 6/2015 |
| CN | 105430700 | A | 3/2016 |
| JP | 2005535253 | A | 11/2005 |
| WO | 2014180129 | A1 | 12/2013 |
| WO | 2015106801 | A1 | 7/2015 |

OTHER PUBLICATIONS

Rohan, M., et al.,"Designing High Performance Enterprise Wi-Fi Networks," XP061010685, USENIX Association, Apr. 5, 2008, pp. 73-88.
Foreign Communication From a Counterpart Application, European Application No. 17198388.5, Extended European Search Report dated Mar. 8, 2018, 5 pages.
Foreign Communication From a Counterpart Application, Japanese Application No. 2017-205004, Japanese Office Action dated Nov. 5, 2018, 4 pages.
Foreign Communication From a Counterpart Application, Japanese Application No. 2017-205004, English Translation of Japanese Office Action dated Nov. 5, 2018, 5 pages.
Machine Translation and Abstract of Chinese Publication No. CN105430700, Mar. 23, 2016, 9 pages.
Foreign Communication From a Counterpart Application, Chinese Application No. 201610940510.6, Chinese Office Action dated Sep. 3, 2019, 7 pages.
Foreign Communication From a Counterpart Application, Japanese Application No. 2017-205004, Japanese Office Action dated Aug. 5, 2019, 4 pages.
Foreign Communication From a Counterpart Application, Japanese Application No. 2017-205004, English Translation of Japanese Office Action dated Aug. 5, 2019, 5 pages.

\* cited by examiner

WIRELESS LOCAL AREA NETWORK ASSOCIATION METHOD AND DEVICE, AND CENTRAL ACCESS POINT

CROSS-REFERENCE TO RELATED APPLICATION

This application claims priority to Chinese Patent Application No. 201610940510.6 filed on Oct. 25, 2016, which is hereby incorporated by reference in its entirety.

TECHNICAL FIELD

This application relates to the communications field, and in particular, to a wireless local area network (WLAN) association method and device, and a central access point (AP).

BACKGROUND

A WLAN generally includes multiple wireless APs, to provide a WLAN service for a terminal. A wireless AP is a station providing access to a distribution service via a wireless medium for an associated station. The terminal may be a non-AP station or an AP.

If the WLAN has a large coverage area, a large quantity of wireless APs need to be deployed. Each wireless AP has a complete WLAN function. The wireless AP having the complete WLAN function has a complex structure, and the large quantity of wireless APs cause high overall costs of the WLAN.

SUMMARY

This application provides a WLAN association method and device, and a central AP to resolve a problem of how to reply to an association request when multiple APs provide a same basic service set identifier (BSSID).

According to a first aspect, a WLAN association method is provided, including receiving, by a central AP, multiple association requests, where the multiple association requests are from at least two APs, and the multiple association requests have a same BSSID, selecting, by the central AP, one association request from the multiple association requests as a to-be-replied association request, and sending, by the central AP, a first association response to a to-be-associated AP, where the first association response is a reply to the to-be-replied association request, and the to-be-associated AP is an AP in the at least two APs that sends the to-be-replied association request.

A combination of the central AP and the at least two APs is used to implement a function of a wireless AP. The central AP and the APs respectively complete some functions of a physical layer (PHY layer) and data link layer of the wireless AP. The central AP and the at least two APs are connected using a wired network. The central AP may not include devices such as a radio frequency (RF) circuit and an antenna.

In order to prevent a terminal from considering the multiple APs as independent wireless APs, the terminal needs to sense no handover occurrence when being handed over between the APs. Therefore, the multiple APs provide a same BSSID. When the multiple APs provide a same BSSID, an association request for requesting the BSSID by the terminal may be received by at least two APs. The central AP selects only one AP as a to-be-associated AP. Only the to-be-associated AP provides a service for the terminal such that a possibility of conflict occurrence is reduced.

With reference to the first aspect, in a first implementation of the first aspect, after selecting the to-be-replied association request, the central AP further sends the to-be-replied association request to a WLAN controller. The central AP receives the first association response sent by the WLAN controller.

The central AP sends the association request to the WLAN controller, and the WLAN controller may determine whether to allow an association of the terminal.

With reference to the first aspect or the first implementation of the first aspect, in a second implementation of the first aspect, the multiple association requests have a same transmitter address, and/or values of Sequence Control fields of the multiple association requests are the same.

If the wireless AP including the central AP and the multiple APs generates a same BSSID for multiple terminals, different terminals may share the BSSID. Because it is not required that each terminal is associated with a different BSSID, when multiple terminals request one BSSID, the central AP may send an association response to each terminal. The central AP uses, as multiple to-be-compared association requests, association requests that are from one terminal and that are in all association requests for requesting a same BSSID.

With reference to the first aspect or the first implementation of the first aspect, in a third implementation of the first aspect, the multiple association requests belong to multiple association request sets. Any two association request sets in the multiple association request sets are from different terminals.

Each association request set in the multiple association request sets includes at least one association request. A terminal from which an association request set comes is a terminal from which any association request in the association request set comes. Association requests in each association request set are from one terminal.

If the wireless AP including the central AP and the multiple APs generates a unique BSSID for each terminal, because each terminal is associated with a different BSSID, when multiple terminals request one BSSID, the central AP can respond to only one of the multiple terminals. The central AP uses all association requests for requesting a same BSSID as multiple to-be-compared association requests, and selects only a terminal of one of the association requests to respond. The multiple association requests are divided into association request sets from the terminals when association requests from multiple terminals are received.

With reference to any one of the first aspect, or the first to the third implementations of the first aspect, in a fourth implementation of the first aspect, selecting one association request from the multiple association requests as a to-be-replied association request includes selecting a first received association request in the multiple association requests as the to-be-replied association request.

Selecting a to-be-replied association request based on an order of receiving association requests is a simplest manner of selecting the to-be-replied association request.

With reference to any one of the first aspect, or the first to the third implementations of the first aspect, in a fifth implementation of the first aspect, selecting one association request from the multiple association requests as a to-be-replied association request includes obtaining respective signal strength that is of the multiple association requests and that is measured by the at least two APs, and selecting, as the to-be-replied association request, an association request in the multiple association requests that has maximum signal strength.

Selecting a to-be-replied association request based on signal strength of association requests may enable an AP having a strongest signal to provide a service for a terminal.

With reference to the third implementation of the first aspect, in a sixth implementation of the first aspect, selecting one association request from the multiple association requests as a to-be-replied association request includes obtaining respective signal strength that is of the multiple association requests and that is measured by the at least two APs, and selecting, as the to-be-replied association request, an association request that is in a first received association request set and that has maximum signal strength. The first received association request set is a set, in the multiple association request sets to which first received association requests belong. The first received association requests are first received association requests in the multiple association requests.

If the wireless AP including the central AP and the multiple APs generates a unique BSSID for each terminal, when multiple terminals request one BSSID, the central AP can respond to only one of the multiple terminals. The central AP selects, based on signal strength of association requests, a to-be-replied association request for a terminal that first sends an association request. This may enable an AP having a strongest signal to provide a service for the terminal that first sends the association request, and prevent a terminal that sends an association request later from using a same BSSID.

With reference to the first aspect or the second implementation of the first aspect, in a seventh implementation of the first aspect, selecting one association request from the multiple association requests as a to-be-replied association request includes obtaining respective signal strength that is of the multiple association requests and that is measured by the at least two APs, and selecting, as the to-be-replied association request, an association request in the multiple association requests that has maximum signal strength. After receiving a first received association request, the method further includes sending, by the central AP, the first received association request to a WLAN controller, where the first received association request is a first received association request in the multiple association requests, and receiving, by the central AP, a second association response sent by the WLAN controller, where the second association response is a reply to the first received association request received by the central AP.

Selecting a to-be-replied association request based on signal strength of association requests may enable an AP having a strongest signal to provide a service for a terminal. However, selection based on the signal strength of the association requests can be performed only after all association requests in the multiple association requests are received. If the central AP needs to send a to-be-replied association request to the WLAN controller, the central AP can send the to-be-replied association request to the WLAN controller only after selecting the to-be-replied association request. This affects timeliness of making a decision by the WLAN controller. The central AP may first send, to the WLAN controller, a first association request received by the central AP. Because association requests from a same terminal have same content, a decision made by the WLAN controller according to this association request is definitely the same as a decision made according to the to-be-replied association request. In this case, the timeliness of making a decision by the WLAN controller may be improved.

With reference to the third implementation of the first aspect, in an eighth implementation of the first aspect, selecting one association request from the multiple association requests as a to-be-replied association request includes obtaining respective signal strength that is of the multiple association requests and that is measured by the at least two APs, and selecting, as the to-be-replied association request, an association request that is in a first received association request set and that has maximum signal strength. The first received association request set is a set, in the multiple association request sets, to which first received association requests belong. The first received association requests are first received association requests in the multiple association requests.

Selecting a to-be-replied association request based on a combination of an order of receiving association requests and signal strength of the association requests may enable an AP having a strongest signal to provide a service for a terminal that first sends an association request.

With reference to the eighth implementation of the first aspect, in a ninth implementation of the first aspect, after receiving the first received association requests, the method further includes sending, by the central AP, the first received association requests to the WLAN controller, and receiving, by the central AP, second association responses sent by the WLAN controller, where the second association responses are replies to the first received association requests received by the central AP.

Selecting a to-be-replied association request based on a combination of an order of receiving association requests and signal strength of the association requests may enable an AP having a strongest signal to provide a service for a terminal that first sends an association request. However, the selection can be performed only after all association requests of the terminal are received. If the central AP needs to send a to-be-replied association request to the WLAN controller, the central AP can send the to-be-replied association request to the WLAN controller only after selecting the to-be-replied association request. This affects timeliness of making a decision by the WLAN controller. The central AP may first send, to the WLAN controller, a first association request received by the central AP. Both the first association request and the to-be-replied association request that are received by the central AP are from the terminal that first sends the association request. Because association requests from a same terminal have same content, a decision made by the WLAN controller according to this association request is definitely the same as a decision made according to the to-be-replied association request. In this case, the timeliness of making a decision by the WLAN controller may be improved.

With reference to any one of the first aspect, or the first to the ninth implementations of the first aspect, in a tenth implementation of the first aspect, the method further includes obtaining, by the central AP, identifiers of multiple RF circuits, where the identifiers of the multiple RF circuits separately identify RF circuits in multiple APs, the multiple APs include the at least two APs, and each AP in the multiple APs includes at least one RF circuit, recording, by the central AP, a mapping from the identifiers of the multiple RF circuits to the multiple APs, sending, by the central AP, the identifiers of the multiple RF circuits to the WLAN controller, receiving, by the central AP, respective configurations that are of the multiple RF circuits and that are sent by the WLAN controller, where each configuration in the respective configurations of the multiple RF circuits includes an identifier of a corresponding RF circuit, and separately sending, by the central AP, each configuration in the respective configurations of the multiple RF circuits to the multiple APs according to the mapping from the identifiers of the multiple RF circuits to the multiple APs.

In the foregoing configuration manner, the WLAN controller may sense each RF circuit in the multiple APs.

With reference to any one of the first aspect, or the first to the ninth implementations of the first aspect, in an eleventh implementation of the first aspect, the method further includes obtaining, by the central AP, identifiers of multiple RF circuits and respective operating frequency bands of the multiple RF circuits, where the identifiers of the multiple RF circuits separately identify RF circuits in multiple APs, the multiple APs include the at least two APs, and each AP in the multiple APs includes at least one RF circuit, generating, by the central AP, a virtual identifier for RF circuits that have a same operating frequency band, recording, by the central AP, a first mapping and a second mapping, where the first mapping is a mapping from the identifiers of the multiple RF circuits to the multiple APs, the second mapping is a mapping from the identifiers of the multiple RF circuits to at least one virtual identifier, each virtual identifier in the at least one virtual identifier corresponds to RF circuits that have a same operating frequency band in the multiple RF circuits, and RF circuits corresponding to different virtual identifiers have different operating frequency bands, sending, by the central AP, the at least one virtual identifier to the WLAN controller, receiving, by the central AP, at least one configuration corresponding to the at least one virtual identifier and that is sent by the WLAN controller, where each configuration in the at least one configuration includes a corresponding virtual identifier, and separately sending, by the central AP, respective configurations of the multiple RF circuits to the multiple APs according to the first mapping and the second mapping, where RF circuits that have a same operating frequency band in the multiple RF circuits have a same configuration.

In the foregoing configuration manner, the central AP integrates RF circuits that have a same operating frequency band in the multiple APs into one virtual RF circuit, and generates a corresponding virtual identifier. The WLAN controller senses only the virtual RF circuit.

According to a second aspect, a WLAN association device is provided. The device includes modules that perform the method in any one of the first aspect or implementations of the first aspect.

According to a third aspect, a central AP is provided. The central AP includes a processor and a communications interface. The processor is configured to perform the method in any one of the first aspect or implementations of the first aspect.

According to a fourth aspect, a computer readable medium is provided. The computer readable medium stores a WLAN association program that can be executed by a computer. The program includes an instruction used to perform the method in any one of the first aspect or implementations of the first aspect.

DESCRIPTION OF EMBODIMENTS

The following describes embodiments of the present disclosure with reference to FIG. 1 to FIG. 7.

Figure 1:
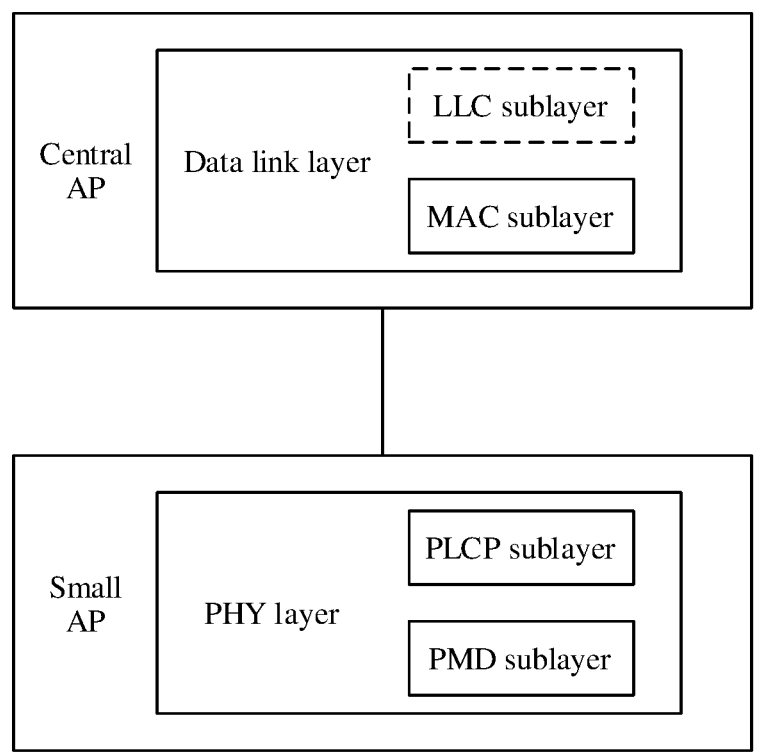
FIG. 1 is a schematic diagram of WLAN function division in a central AP and small AP according to an embodiment of the present disclosure.
Figure 2:
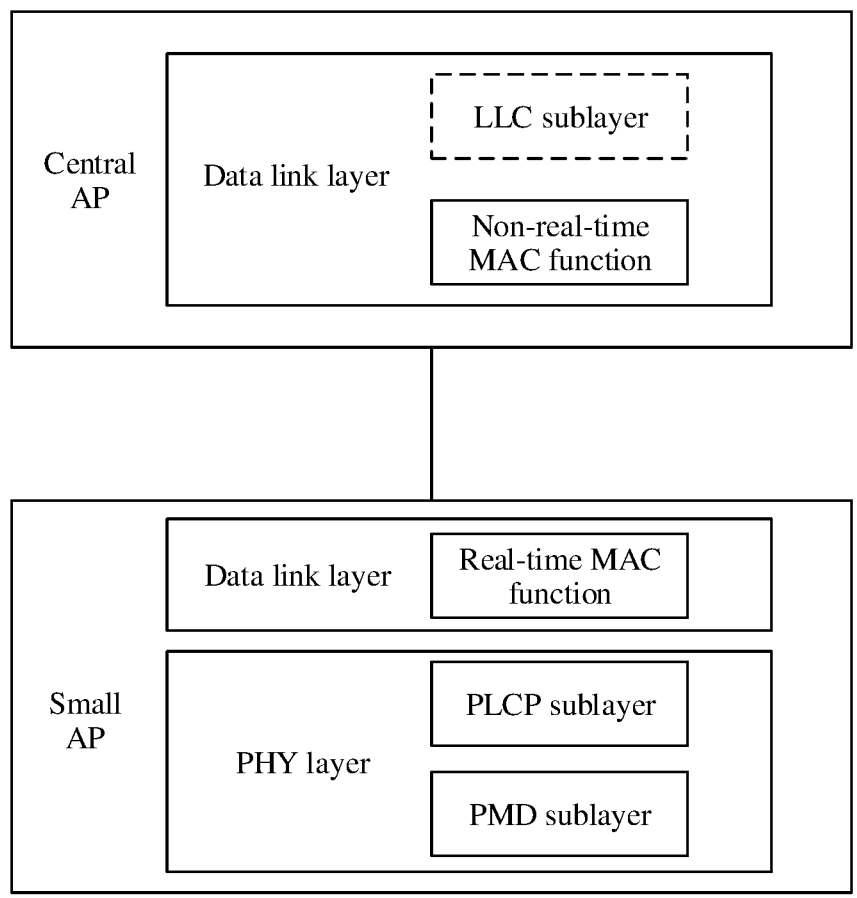
FIG. 2 is another schematic diagram of WLAN function division in a central AP and small AP according to an embodiment of the present disclosure.

FIG. 1 and FIG. 2 are two schematic diagrams of WLAN function division in a central AP and small AP according to an embodiment of the present disclosure.

A conventional WLAN is divided into a PHY layer and a data link layer. The PHY layer further includes a PHY layer convergence procedure (PLCP) sublayer and a physical medium dependent (PMD) sublayer. The data link layer further includes a medium access control (MAC) sublayer. The MAC sublayer may be coupled to a higher layer, such as a logical link control (LLC) sublayer of a wired network. Layers or sublayers are connected using an interface that is referred to as a service AP (SAP). For example, an interface between the PLCP sublayer and the PMD sublayer is a PMD_SAP, an interface between the MAC sublayer and the PLCP sublayer is a PHY_SAP, and an interface between the MAC sublayer and a higher layer is a MAC_SAP.

In this embodiment of the present disclosure, the MAC sublayer is further divided into a real-time MAC function and a non-real-time MAC function.

The real-time MAC function is a MAC sublayer function that has a high requirement for processing duration. For example, the real-time MAC function includes one or more of a distributed coordination function (DCF), a hybrid coordination function (HCF), a mesh coordination function (MCF), receiving and transmitting a MAC service data unit (MSDU), receiving and transmitting a MAC management protocol data unit (MMPDU), beamforming, antenna selection (ASEL), radio measurement, or the like.

The non-real-time MAC function is a MAC sublayer function that has a low requirement for processing duration. For example, the non-real-time MAC function includes one or more of authentication, deauthentication, association, disassociation, reassociation, data confidentiality, fragmentation, defragmentation, dynamic frequency selection (DFS), a MAC sublayer management entity (MLME), transmit power control (TPC), or the like.

In this embodiment of the present disclosure, a combination of a central AP and small APs is used to implement a function of a conventional wireless AP. The central AP and the multiple small APs are connected using a wired network. The wired network may be Ethernet. The central AP and the small APs may be directly connected using an Ethernet cable, or may be connected using an Ethernet switch. In this application, "multiple" indicates two or more. The central AP may not include devices such as an RF circuit and an antenna. The RF circuit is also referred to as an RF module, and is configured to receive and transmit a radio signal. Because the central AP may not need a wireless function, and the central AP is not a conventional wireless AP, the central AP may also be referred to as an AP controller. However, the small AP has a wireless function. Therefore, the small AP may also be referred to as a wireless AP or an AP. The small AP may be implemented using a conventional AP. The small AP may also be a specially designed AP. The combination of the central AP and the multiple small APs may be considered as a wireless AP having multiple RF circuits. The central AP and the small APs respectively complete some functions of a PHY layer and data link layer of the conventional wireless AP. For example, as shown in FIG. 1, a central AP completes a function of a data link layer, and a small AP completes a function of a PHY layer. For another example, as shown in FIG. 2, a central AP completes a non-real-time MAC function, and a small AP completes a real-time MAC function and a function of a PHY layer.

For example, the central AP and the small APs are connected using the Ethernet. When receiving a MAC protocol data unit (MPDU) sent by a terminal, the small APs may add the MPDU to an Ethernet frame and sends the Ethernet frame to the central AP. The small APs may directly add the MPDU to a payload of the Ethernet frame, or may convert the MPDU to an Ethernet frame. For example, if a frame body of an MPDU is an MSDU or an aggregated MSDU (A-MSDU), the small AP may directly add the MPDU to a payload of an Ethernet frame. If a frame body of an MPDU is an MMPDU, the small AP may convert the MPDU to an Ethernet frame.

Figure 3:
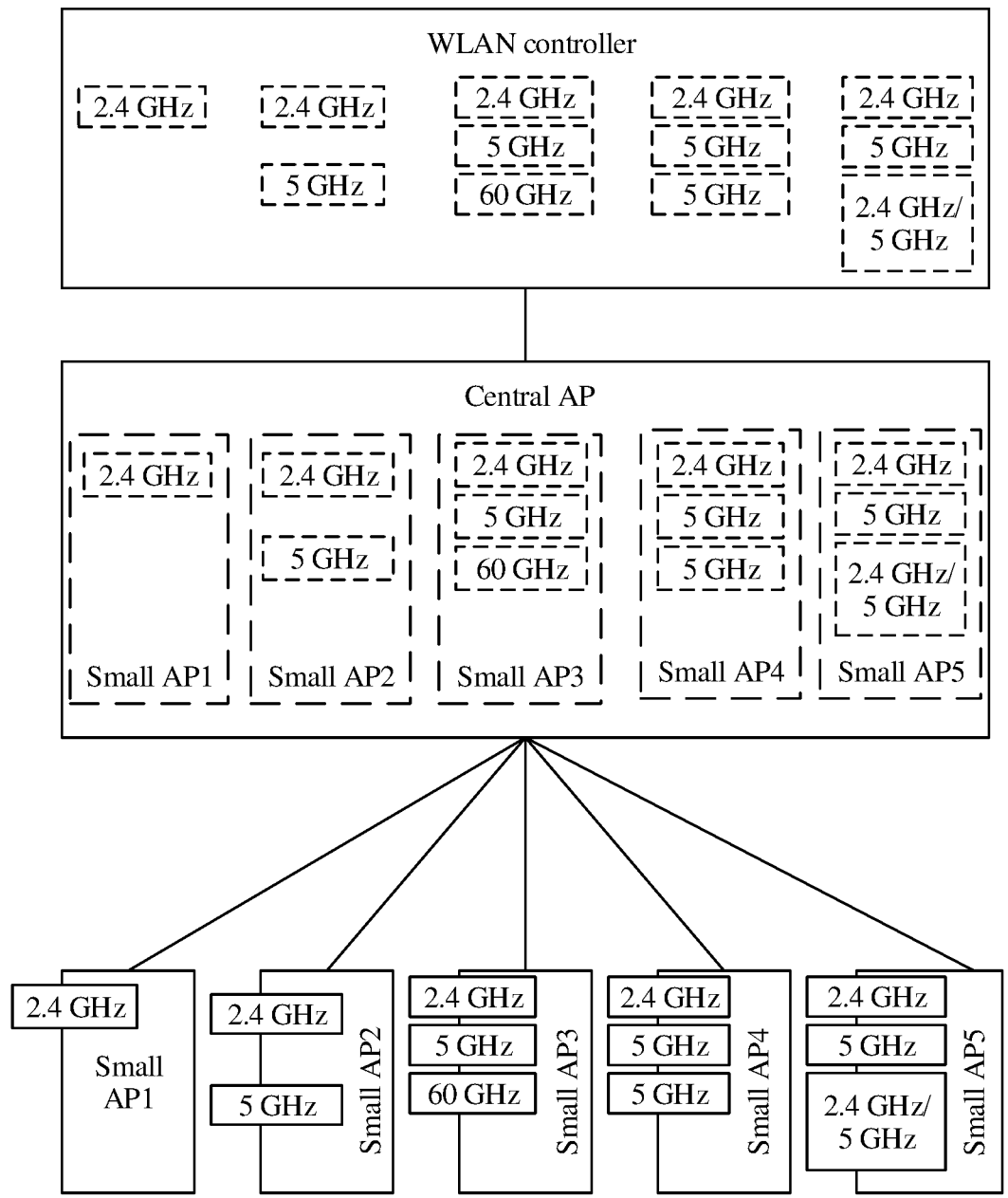
FIG. 3 is a schematic diagram of a manner of configuring an RF circuit by a WLAN controller according to an embodiment of the present disclosure.
Figure 4:
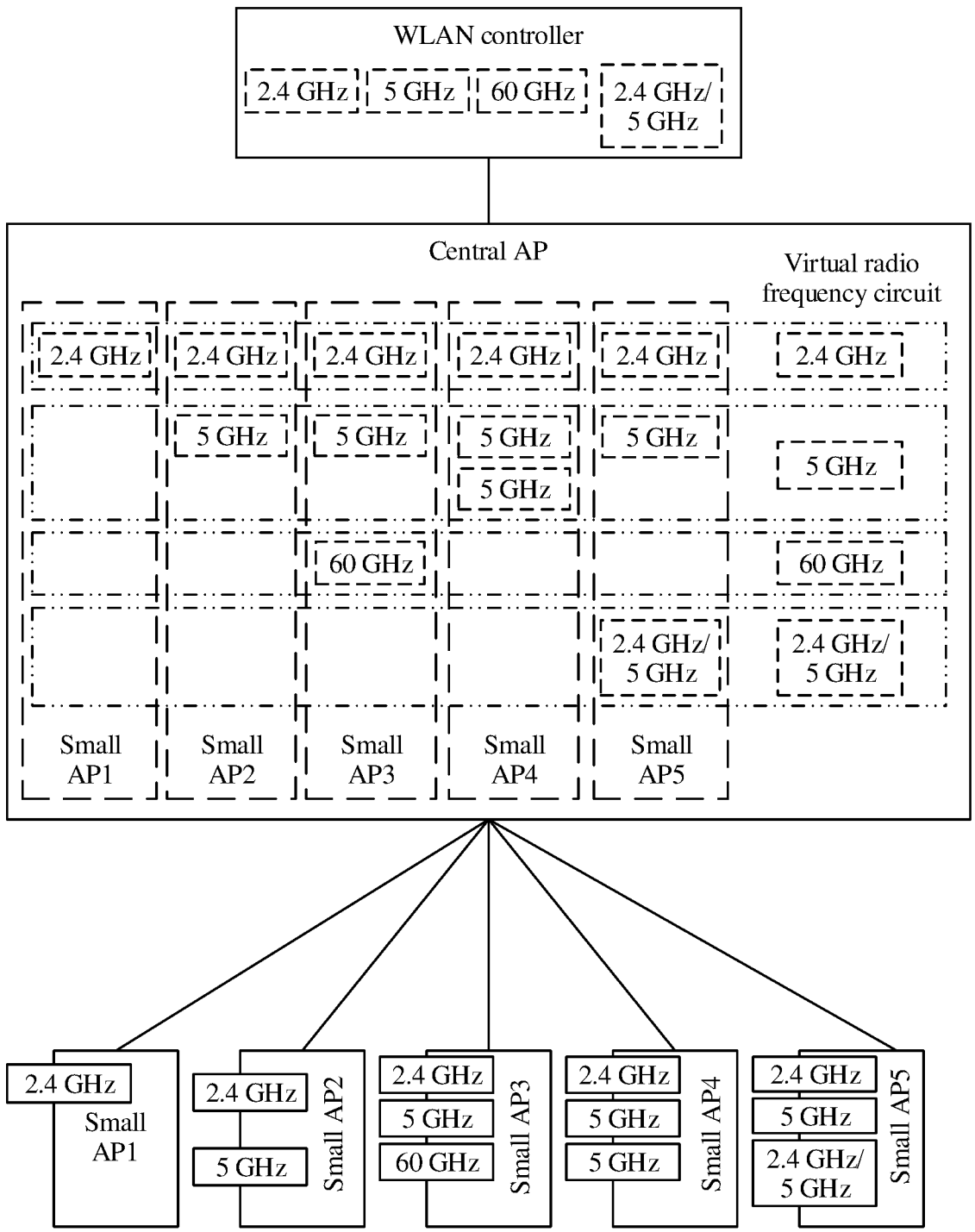
FIG. 4 is a schematic diagram of another manner of configuring an RF circuit by a WLAN controller according to an embodiment of the present disclosure.

Each small AP may have one or more RF circuits. RF circuits in a small AP having multiple RF circuits may have a same operating frequency band or may have different operating frequency bands. For example, as shown in FIG. 3 and FIG. 4, five small APs are connected to one central AP. The five small APs are respectively a small AP1 to a small AP5. FIG. 3 and FIG. 4 are respectively schematic diagrams of two manners of configuring an RF circuit by a WLAN controller according to an embodiment of the present disclosure.

The small AP1 has one RF circuit whose operating frequency band is 2.4 Gigahertz (GHz). A small AP2 has two RF circuits whose operating frequency bands are respectively 2.4 GHz and 5 GHz. A small AP3 has three RF circuits whose operating frequency bands are respectively 2.4 GHz, 5 GHz, and 60 GHz. A small AP4 has three RF circuits, where an operating frequency band of one RF circuit is 2.4 GHz, and operating frequency bands of the other two RF circuits are 5 GHz. The small AP5 has three RF circuits whose operating frequency bands are respectively 2.4 GHz, 5 GHz, and 2.4 GHz/5 GHz. A 2.4 GHz/5 GHz operating frequency band of an RF circuit indicates that the RF circuit may select a current operating frequency band from 2.4 GHz and 5 GHz.

In the manner of configuring an RF circuit by a WLAN controller shown in FIG. 3, the WLAN controller may sense each RF circuit in small APs.

A central AP first obtains an identifier of an RF circuit in each small AP. For example, the central AP obtains a local area identifier of the RF circuit in each small AP from the multiple small APs. Because different small APs may use a same local area identifier, the central AP uses, as an identifier of an RF circuit, a combination of a local area identifier of the RF circuit and an identifier of a small AP in which the RF circuit is located. For another example, if ranges of identifiers of RF circuits in the small APs do not overlap, that is, any two RF circuits have different local area identifiers, local area identifiers that are of the RF circuits and that are obtained from the small APs may be directly used as the identifiers of the RF circuits.

The central AP records a mapping from the identifiers of the RF circuits to the small APs, and sends the identifiers of the RF circuits to the WLAN controller.

The WLAN controller designates a proper configuration for each RF circuit. For example, the WLAN controller may select a corresponding configuration from a configuration set for an RF circuit according to an operating frequency band of the RF circuit. The configuration set includes a mapping from multiple frequency bands to multiple configurations. Optionally, when sending an identifier of an RF circuit to the WLAN controller, the central AP also sends a value of an operating frequency band of each RF circuit. Alternatively, the identifier of the RF circuit may be designed as a frequency band that can indicate a corresponding RF circuit. For example, highest-order bits of identifiers of RF circuits whose operating frequency bands are respectively 2.4 GHz, 5 GHz, 2.4 GHz/5 GHz, and 60 GHz are respectively 1, 2, 3, and 4. The WLAN controller may determine an operating frequency band of an RF circuit according to an identifier of the RF circuit, and further select a corresponding configuration for the RF circuit.

The WLAN controller sends a configuration of each RF circuit to the central AP. The configuration of each RF circuit includes an identifier of a corresponding RF circuit. The central AP sends the configuration of each RF circuit to a corresponding small AP according to the mapping that is from the identifiers of the RF circuits to the small APs and that is recorded by the central AP.

In the manner of configuring an RF circuit by a WLAN controller shown in FIG. 4, a central AP integrates RF circuits that have a same operating frequency band in small APs into one virtual RF circuit, and generates a corresponding virtual identifier. The WLAN controller senses only the virtual RF circuit.

The central AP obtains an identifier of each RF circuit from the small APs. If an identifier of an RF circuit can indicate an operating frequency band of the RF circuit, the central AP determines the operating frequency band of the RF circuit according to the identifier of the RF circuit. Alternatively, the central AP directly obtains a value of an operating frequency band of each RF circuit from the small APs. After determining the identifier and the operating frequency band of each RF circuit in the small APs, the central AP generates a virtual identifier for RF circuits that have a same operating frequency band. The virtual identifier is an identifier of a virtual RF circuit.

The central AP records a first mapping and a second mapping. The first mapping is a mapping from an identifier of an RF circuit to a small AP. The second mapping is a mapping from generators of a virtual RF circuit to the virtual RF circuit, that is, a mapping from identifiers of RF circuits to a virtual identifier. Each virtual identifier corresponds to RF circuits that have a same operating frequency band, and RF circuits corresponding to different virtual identifiers have different operating frequency bands.

The central AP sends a virtual identifier of each virtual RF circuit to the WLAN controller. The WLAN controller designates a proper configuration for each virtual RF circuit. For example, the WLAN controller may select a corresponding configuration from a configuration set for a virtual RF circuit according to an operating frequency band of the virtual RF circuit. The configuration set includes a mapping from multiple frequency bands to multiple configurations.

When sending the virtual identifier to the WLAN controller, the central AP also sends a value of an operating frequency band of each virtual RF circuit. Alternatively, the virtual identifier may be designed as a frequency band that can indicate a corresponding virtual RF circuit. The WLAN controller may determine an operating frequency band of a corresponding virtual RF circuit according to a virtual identifier, and further select a corresponding configuration for the virtual RF circuit.

The WLAN controller sends a configuration of each virtual RF circuit to the central AP. The configuration of each virtual RF circuit includes a corresponding virtual identifier. The central AP receives at least one configuration corresponding to at least one virtual identifier and that is sent by the WLAN controller, and each configuration in the at least one configuration includes a corresponding virtual identifier.

The central AP determines configuration of each RF circuit according to the second mapping. Configurations of all RF circuits mapped to one virtual RF circuit in the second mapping are configurations designated by the WLAN controller for the virtual RF circuit. The central AP sends the configuration of each RF circuit to the small APs according to the first mapping.

For example, in the foregoing example, the central AP integrates 12 RF circuits in the small AP1 to the small AP5 into four virtual RF circuits. Operating frequency bands of the four virtual RF circuits are respectively 2.4 GHz, 5 GHz, 2.4 GHz/5 GHz, and 60 GHz. The central AP generates four virtual identifiers for the four virtual RF circuits. The four virtual identifiers are respectively 1, 2, 3, and 4. The WLAN controller designates four configurations for the four virtual RF circuits. The four configurations are respectively a configuration 1, a configuration 2, a configuration 3, and a configuration 4. The central AP receives the four configurations, and determines that configurations of all RF circuits whose operating frequency bands are 2.4 GHz are the configuration 1, configurations of all RF circuits whose operating frequency bands are 5 GHz are the configuration 2, configurations of all RF circuits whose operating frequency bands are 2.4 GHz/5 GHz are the configuration 3, and configurations of all RF circuits whose operating frequency bands are 60 GHz are the configuration 4.

As described above, a combination of a central AP and multiple small APs may be considered as a wireless AP having multiple RF circuits. Further, to prevent a terminal from considering the multiple small APs as independent wireless APs, the terminal needs to sense no handover occurrence when being handed over between the small APs. When a terminal is handed over between APs in a conventional manner, the terminal needs to change a basic service set (BSS) in which the terminal is located. Correspondingly, the terminal requests to be associated with a BSS whose BSSID is different from a BSSID of an associated BSS before handover (a BSS identified by an associated BSSID is also referred to as an associated BSSID below). Therefore, in order that the terminal senses no handover occurrence, a BSSID change needs to be avoided. When a new small AP provides a service for the terminal, a BSSID used when an old small AP provides a service for the terminal is simulated. This process may be considered as a process in which the BSSID moves with the terminal.

The central AP or a WLAN controller may determine, according to signal strength that is of a terminal signal and that is measured by a small AP currently providing a service for the terminal and signal strength that is of a terminal signal and that is measured by another small AP, whether to instruct a new small AP to provide a service for the terminal.

Two optional solutions for generating a BSSID are as follows.

Solution 1: The wireless AP including the central AP and the multiple small APs may generate a unique BSSID for each terminal. In this solution, BSSIDs of BSSs associated with different terminals are different. Beacon frames sent by the multiple small APs have a same BSSID. Receiver addresses (RAs) of the beacon frames are usually broadcast addresses. An RA is a MAC address. If a terminal succeeds in association with the BSSID, all small APs that send beacon frames whose BSSIDs are the BSSID no longer send a beacon frame whose BSSID is the BSSID, but send a beacon frame whose BSSID is a new BSSID.

Solution 2: The wireless AP including the central AP and the multiple small APs may generate a same BSSID for multiple terminals. In this solution, different terminals may share the BSSID. Beacon frames sent by the multiple small APs have a same BSSID. RAs of the beacon frames are usually broadcast addresses. Optionally, after one or more terminals succeed in association with the BSSID, all small APs that send beacon frames whose BSSIDs are the BSSID no longer send a beacon frame whose BSSID is the BSSID, but send a beacon frame whose BSSID is a new BSSID. A threshold of a quantity of terminals with which one BSSID can be associated may be fixed or may be dynamically adjusted.

Before an AP allows a terminal to send data using the AP, the terminal needs to be associated with the AP. A conventional AP provides an independent BSSID. That the terminal is associated with the AP indicates that the terminal joins in a BSS identified by the BSSID. However, in the foregoing two solutions, the multiple small APs provide a same BSSID. After a terminal is associated, the terminal joins in a BSS identified by the BSSID, instead of being associated with a specific AP. An association request for requesting the BSSID by the terminal may be received by two or more small APs. Multiple small APs send the association request to the central AP. If the central AP selects multiple small APs to provide a service for the terminal, the multiple small APs providing a service for the terminal may conflict with each other. Therefore, a solution of associating a terminal with a WLAN needs to be provided. One of the small APs provides a service for the terminal in order to reduce conflicts. The association request may be an Association Request frame, or may be a Reassociation Request frame.

Figure 5:
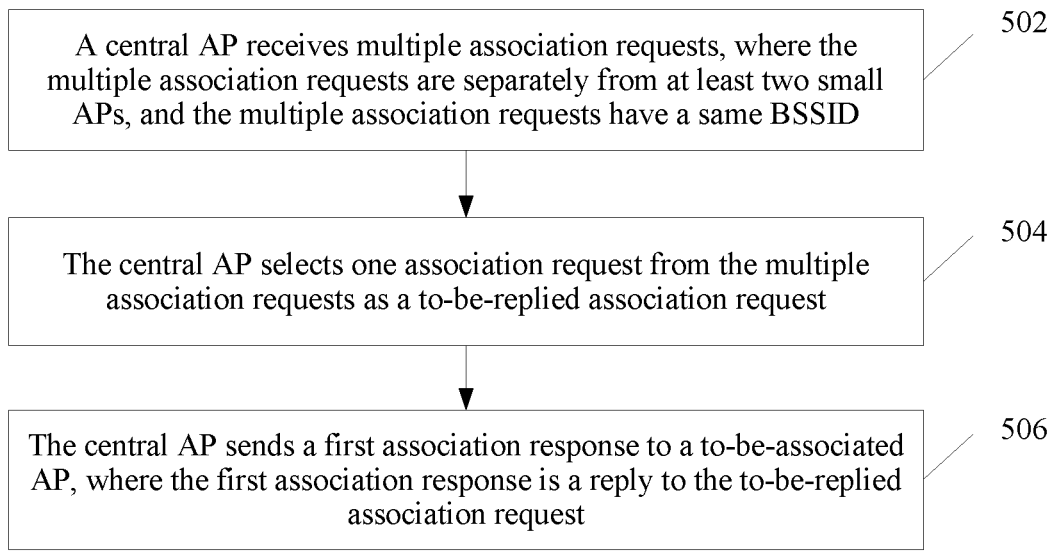
FIG. 5 is a flowchart of a WLAN association method according to an embodiment of the present disclosure.

FIG. 5 is a flowchart of a WLAN association method according to an embodiment of the present disclosure. The method includes the following steps.

Step 502: A central AP receives multiple association requests, where the multiple association requests are separately from at least two small APs, and the multiple association requests have a same BSSID.

A terminal sends an association request, and one or more small APs may receive the association request. A small AP sends the received association request to the central AP. The terminal is an originator of the association request, and the small AP is a forwarder of the association request. The small AP may add an MPDU of the association request to a payload of an Ethernet frame to be sent to the central AP. The small AP may also generate an Ethernet frame in a specified format based on the association request. A transmitter address (TA) of the association request is in the payload of the Ethernet frame. The TA of the association request is not a source address (SA) in a frame header of the Ethernet frame. A payload of an Ethernet frame generated by the small AP based on the association request may further include a Sequence Control field in the association request.

Because the central AP and the small AP are usually provided by a same manufacturer, the small AP may send the association request using a self-defined frame instead of a common Ethernet frame. Although the self-defined frame and the common Ethernet frame are in different formats, the self-defined frame may also be referred to as an Ethernet frame for being transmitted in Ethernet.

Step 504: The central AP selects one association request from the multiple association requests as a to-be-replied association request.

The central AP compares association requests for requesting a same BSSID, and selects one of the association requests to respond. The association requests for requesting the same BSSID may be from one or more terminals. A forwarder (i.e., a small AP) of the selected association request is referred to as a to-be-associated AP. If an association between the terminal and a WLAN is allowed, the to-be-associated AP provides a service for the terminal.

Step 506: The central AP sends a first association response to a to-be-associated AP, where the first association response is a reply to the to-be-replied association request.

If the association request is an Association Request frame, the association response is an Association Response frame. If the association request is a Reassociation Request frame, the association response is a Reassociation Response frame.

The first association response may be in a payload of an Ethernet frame, or may be an Ethernet frame in a specified format, or may be a self-defined frame. The to-be-associated AP sends an association response in a WLAN format to the terminal according to the first association response.

The central AP may further send, to another small AP in the at least two small APs other than the to-be-associated AP, an association response that has same content as the first association response. A small AP that receives the association response sends an association response in a WLAN format to the terminal according to the association response. Although the central AP may reply to another association request other than the to-be-replied association request, a forwarder of the association request is not the to-be-associated AP, and therefore, the forwarder of the association request does not provide a service for the terminal after sending an association response. In addition, the association response has same content as the first association response. Therefore, the association response and the first association response are replies to an originator of the to-be-replied association request.

If Solution 1 is used, because each terminal is associated with a different BSSID, when multiple terminals request one BSSID, the central AP can respond to only one of the multiple terminals. After the terminal is associated with the BSSID, the small APs change a BSSID of a beacon frame. Remaining terminals may request to be associated with the new BSSID. Therefore, the central AP uses all association requests for requesting a same BSSID as multiple to-be-compared association requests, and selects one of the association requests to respond.

Optionally, the central AP may compare association requests that are for requesting a same BSSID and that are received in a time period.

For example, timing is started when the central AP receives a first association request on which no comparison is performed, and the timing is completed after a time period. The central AP compares association requests that are received in the time period from timing start to timing completion and that request a same BSSID as the first association request on which no comparison is performed. The central AP selects one association request from the association requests, and replies to the association request with a first association response.

For another example, the time period starts from receiving, by the central AP, a first association request on which no comparison is performed, and ends when the small APs change a BSSID of a beacon frame. The central AP compares association requests that are received in the time period and that request a same BSSID as the first association request on which no comparison is performed. The central AP selects one association request from the association requests, and replies to the association request with a first association response.

If Solution 2 is used, because it is not required that each terminal is associated with a different BSSID, when multiple terminals request one BSSID, the central AP may send an association response to each terminal. Therefore, the central AP uses, as multiple to-be-compared association requests, association requests that are from one terminal and that are in all association requests for requesting a same BSSID. The central AP may distinguish association requests from different terminals based on a TA. The TA is a MAC address. Alternatively, the central AP may distinguish, based on a value of a Sequence Control field (for example, the value of the Sequence Control field may be a sequence number or a combination of a sequence number and a Fragment Number in the Sequence Control field), association requests that are from different terminals. Alternatively, the central AP may distinguish, based on a combination of a TA and a value of a Sequence Control field, association requests that are from different terminals. The central AP uses, as multiple to-be-compared association requests, the association requests that have a same distinguish basis and that are in all association requests for requesting a same BSSID.

Optionally, the central AP may compare association requests that are for requesting a same BSSID, that are from a same terminal, and that are received in a time period.

For example, timing is started when the central AP receives a first association request on which no comparison is performed, and the timing is completed after a time period. The central AP compares association requests that are for requesting a same BSSID as the first association request on which no comparison is performed, that are from a same terminal as the first association request on which no comparison is performed, and that are received in the time period from timing start to timing completion. The central AP selects one association request from the association requests, and replies to the association request with a first association response.

Optionally, the central AP sends the association request to a WLAN controller, and the WLAN controller determines whether to allow an association of the terminal. The central AP may communicate with the WLAN controller using a Control and Provisioning of Wireless APs (CAPWAP) protocol. The WLAN controller serves as an Access Controller (AC) in the CAPWAP protocol. The central AP (or a combination of the central AP and the small APs) serves as a Wireless Termination Point (WTP) in the CAPWAP protocol.

If the central AP sends an association request to the WLAN controller, the central AP may first select a to-be-replied association request, and then send the selected to-be-replied association request to the WLAN controller. Alternatively, because association requests from a same terminal have same content, the central AP may first send any one of multiple association requests to the WLAN controller, and then select the to-be-replied association request. After selecting the to-be-replied association request, the central AP sends an association response to a small AP (that is, a to-be-associated AP) that sends the selected association request.

If the central AP sends the association request to the WLAN controller, the WLAN controller first determines whether to allow an association of the terminal, and then returns an association response to the central AP. The association response includes a decision on whether to allow the association of the terminal.

The central AP may wait for the association response sent by the WLAN controller. After receiving the association response sent by the WLAN controller, the central AP returns an association response to the to-be-associated AP.

Alternatively, before selecting the to-be-replied association request, if the central AP fails to receive the association response sent by the WLAN controller, the central AP may first return an association response to the to-be-associated AP. The association response allows an association of the terminal. If a subsequently received association response sent by the WLAN controller indicates that the association of the terminal is allowed, the central AP does not need to repeatedly return the association response to the to-be-associated AP. If a subsequently received association response sent by the WLAN controller indicates that the association of the terminal is not allowed, the central AP sends a disassociation request to the to-be-associated AP. The disassociation request instructs to terminate the association of the terminal that sends the to-be-replied association request.

The disassociation request may be a Disassociation frame or a Deauthentication frame. The disassociation request may be in a payload of an Ethernet frame, or may be an Ethernet frame in a specified format, or may be a self-defined frame. The to-be-associated AP sends a disassociation request in a WLAN format to the terminal according to the disassociation request in order to terminate the association of the terminal.

The central AP does not wait for the association response sent by the WLAN controller. This may improve timeliness of associating a terminal with a WLAN.

The central AP may select a to-be-replied association request based on an order of receiving association requests, signal strength of association requests, or a combination thereof. Selecting a to-be-replied association request based on an order of receiving association requests is a simplest manner of selecting the to-be-replied association request. Selecting a to-be-replied association request based on signal strength of association requests may enable an AP having a strongest signal to provide a service for a terminal. Selecting a to-be-replied association request based on a combination of an order of receiving association requests and signal strength of the association requests may enable an AP having a strongest signal to provide a service for a terminal that first sends an association request. In different BSSID generation solutions and different solutions (if necessary) for sending an association request to a WLAN controller, an implementation of selecting a to-be-replied association request according to these bases correspondingly changes.

For example, if Solution 1 is used, the central AP uses all association requests for requesting a same BSSID as multiple to-be-compared association requests. If the association requests are from two or more terminals, the association requests belong to multiple association request sets. Each association request set in the association request sets includes at least one association request. One association request set is from one terminal. Any two association request sets in the association request sets are from different terminals. A terminal from which an association request set comes is a terminal from which any association request in the association request set comes. All association requests in an association request set are from one terminal. Terminals from which association requests come may be distinguished based on a TA. Alternatively, terminals from which association requests come may be distinguished based on a value of a Sequence Control field. Alternatively, terminals from which association requests come may be distinguished based on a combination of a TA and a value of a Sequence Control field.

If a to-be-replied association request is selected according to an order of receiving association requests, the central AP may select a first received association request in the multiple association requests as the to-be-replied association request. If the multiple association requests are from one terminal, the terminal receives an association response. If the multiple association requests are from two or more terminals, a terminal that sends the first received association request receives an association response. If the association response allows an association of the terminal, a to-be-associated AP provides a service for the terminal that receives the association response.

Selecting, based on signal strength of association requests, a to-be-replied association request for a terminal that first sends an association request may enable an AP having a strongest signal to provide a service for the terminal that first sends the association request, and prevent a terminal that sends an association request later from using a same BSSID.

If a to-be-replied association request is selected based on signal strength of association requests, the central AP obtains signal strength that is of the association requests and that is measured by small APs. The central AP selects, as the to-be-replied association request, an association request in the multiple association requests that has maximum signal strength. If the multiple association requests are from one terminal, the terminal receives an association response. If the multiple association requests are from two or more terminals, a terminal that sends the association request that has the maximum signal strength receives an association response. If the association response allows an association of the terminal, a to-be-associated AP provides a service for the terminal that receives the association response. If an association request needs to be sent to a WLAN controller, the central AP may send the to-be-replied association request to the WLAN controller after selecting the to-be-replied association request. The central AP receives a reply to the to-be-replied association request, that is, a first association response. The reply is sent by the WLAN controller. The central AP sends the first association response to the to-be-associated AP.

If a to-be-replied association request is selected based on a combination of an order of receiving association requests and signal strength of the association requests, the central AP obtains signal strength that is of the association requests and that is measured by small APs. The central AP selects, as the to-be-replied association request, an association request that is in a first received association request set and that has maximum signal strength. The first received association request set is a set, in association request sets, to which first received association requests belong. The first received association requests are first received association requests in the multiple association requests. If the multiple association requests are from one terminal, only one association request set exists, and an association request that is in the association request set and that has maximum signal strength is the to-be-replied association request. The terminal receives an association response. If the multiple association requests are from two or more terminals, multiple association request sets exist. A terminal that first sends an association request receives an association response. In small APs that receive the association request sent by the terminal, a small AP measuring an association request that has maximum signal strength serves as a to-be-associated AP to send the association response. If the association response allows an association of the terminal, the to-be-associated AP provides a service for the terminal that receives the association response.

If an association request needs to be sent to a WLAN controller, the central AP may send the to-be-replied association request to the WLAN controller after selecting the to-be-replied association request. The central AP receives a reply to the to-be-replied association request, that is, a first association response. The reply is sent by the WLAN controller. The central AP sends the first association response to the to-be-associated AP.

Selection based on the combination of the order of receiving the association requests and the signal strength of the association requests can be performed only after all the association requests of the terminal are received. The central AP sends the to-be-replied association request to the WLAN controller after selecting the to-be-replied association request. This affects timeliness of making a decision by the WLAN controller. Therefore, the central AP may send the first received association requests to the WLAN controller after receiving the first received association requests. The central AP receives second association responses sent by the WLAN controller, and the second association responses are replies to the first received association requests.

The first received association requests and the to-be-replied association request are in the same association request set, that is, the first received association requests and the to-be-replied association request are from the same terminal. Therefore, the first received association requests and the to-be-replied association request have same content. A decision made by the WLAN controller according to the association requests is definitely the same as a decision made according to the to-be-replied association request. In this case, the timeliness of making a decision by the WLAN controller may be improved. The central AP may send the second association response to the to-be-associated AP after receiving the second association response. The second association response is used as a reply (that is, the first association response) to the to-be-replied association request. The central AP may first send, to the WLAN controller, a first association request received by the central AP.

Alternatively, the central AP does not wait for the second association response. If the central AP receives the second association response before selecting the to-be-replied association request, the central AP sends the second association response to the to-be-associated AP after selecting the to-be-replied association request. The second association response is used as the first association response. If the central AP fails to receive the second association response before selecting the to-be-replied association request, the central AP immediately sends the first association response to the to-be-associated AP after selecting the to-be-replied association request. The first association response allows an association of the terminal. If the subsequently received second association response indicates that the association of the terminal is allowed, the central AP does not need to repeatedly return the association response to the to-be-associated AP. If the subsequently received second association response indicates that the association of the terminal is not allowed, the central AP sends a disassociation request to the to-be-associated AP. The disassociation request instructs to terminate the association of the terminal that sends the to-be-replied association request.

For another example, if Solution 2 is used, the foregoing multiple association requests are from a same terminal. If a to-be-replied association request is selected based on an order of receiving association requests, the central AP may select, as a to-be-associated AP, a forwarder of a first received association request in the multiple association requests. A terminal that sends the association request receives an association response. If the association response allows an association of the terminal, the to-be-associated AP provides a service for the terminal that receives the association response.

If a to-be-replied association request is selected based on signal strength of association requests, the central AP obtains signal strength that is of the association requests and that is measured by small APs. The central AP selects, as a to-be-associated AP, a forwarder of an association request in the multiple association requests that has maximum signal strength. A terminal that sends the association request receives an association response. If the association response allows an association of the terminal, the to-be-associated AP provides a service for the terminal that receives the association response.

If an association request needs to be sent to a WLAN controller, the central AP may send the to-be-replied association request to the WLAN controller after selecting the to-be-replied association request. The central AP receives a reply to the to-be-replied association request, that is, a first association response. The reply is sent by the WLAN controller. The central AP sends the first association response to the to-be-associated AP.

The central AP may also send a first received association request to the WLAN controller after receiving the first received association request. The central AP receives a second association response sent by the WLAN controller, and the second association response is a reply to the first received association request.

Because the first received association request and the to-be-replied association request have same content, the central AP may send the second association response to the to-be-associated AP after receiving the second association response. The second association response is used as a reply (that is, the first association response) to the to-be-replied association request.

Alternatively, the central AP does not wait for the second association response. If the central AP receives the second association response before selecting the to-be-replied association request, the central AP sends the second association response to the to-be-associated AP after selecting the to-be-replied association request. The second association response is used as the first association response. If the central AP fails to receive the second association response before selecting the to-be-replied association request, the central AP immediately sends the first association response to the to-be-associated AP after selecting the to-be-replied association request. The first association response allows an association of the terminal. If the subsequently received second association response indicates that the association of the terminal is allowed, the central AP does not need to repeatedly return the association response to the to-be-associated AP. If the subsequently received second association response indicates that the association of the terminal is not allowed, the central AP sends a disassociation request to the to-be-associated AP. The disassociation request instructs to terminate the association of the terminal that sends the to-be-replied association request.

Figure 6:
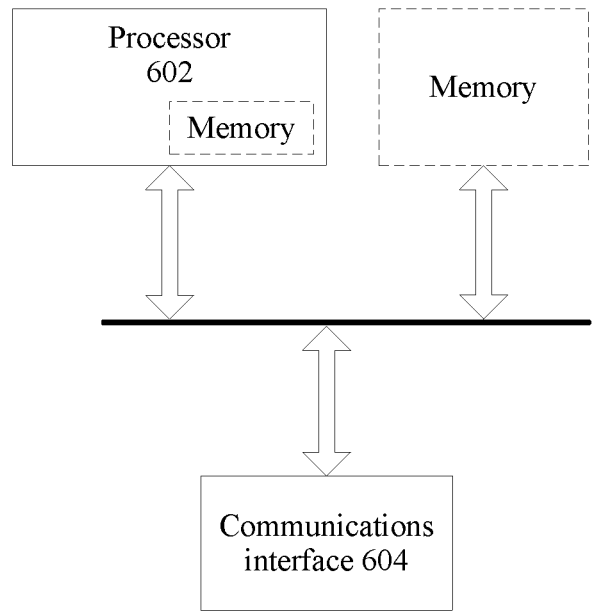
FIG. 6 is a structural diagram of a central AP according to an embodiment of the present disclosure.

FIG. 6 is a structural diagram of a central AP according to an embodiment of the present disclosure.

The central AP includes a processor 602 and a communications interface 604. The processor 602 is connected to the communications interface 604. For example, the processor 602 may be connected to the communications interface 604 using a bus.

The processor 602 may be a central processing unit (CPU), a network processor (NP), or a combination of a CPU and an NP. The processor 602 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The communications interface 604 may be a wired communications interface. For example, the wired communications interface may be one or more Ethernet interfaces. An Ethernet interface may be an optical interface, an electrical interface, or a combination thereof. The communications interface 604 is configured to communicate with a small AP. The communications interface 604 may be further configured to communicate with a WLAN controller. The communications interface 604 may be directly connected to the small AP, or may be connected to the small AP using another network device, or may be connected to a small AP in multiple small APs using another small AP in the multiple small APs.

The central AP may further include a memory. The memory may be an independent device, or may be integrated into the processor 602. The memory may include a volatile memory, for example, a random access memory (RAM). The memory may also include a non-volatile memory, for example, a read-only memory (ROM), a flash memory, a hard disk drive (HDD), or a solid-state drive (SSD). The memory may further include a combination of the memories of the foregoing types. The memory may be configured to store a configuration set, a mapping from an identifier of an RF circuit to a small AP, a mapping from identifiers of RF circuits to a virtual identifier, and the like. If the processor 602 includes a CPU, the memory may further store program code, and transmit the program code to the CPU such that the CPU implements this embodiment of the present disclosure according to an instruction of the program code.

The processor 602 is configured to receive multiple association requests using the communications interface 604. The multiple association requests are separately from at least two small APs, and the multiple association requests have a same BSSID. The processor 602 is further configured to select one association request from the multiple association requests as a to-be-replied association request. The processor 602 is further configured to send a first association response to a to-be-associated AP using the communications interface 604. The first association response is a reply to the to-be-replied association request.

For implementation details of the processor 602, refer to details of the WLAN association method shown in FIG. 5.

Figure 7:
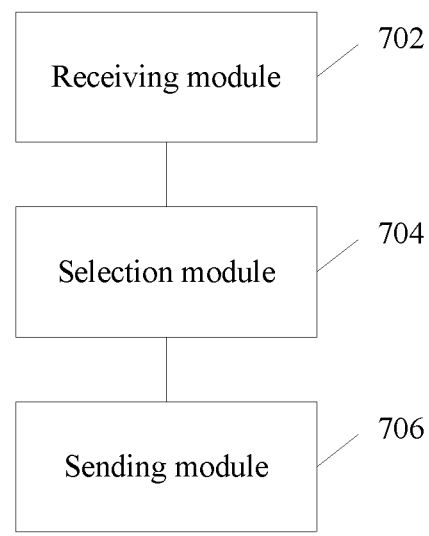
FIG. 7 is a structural diagram of a WLAN association device according to an embodiment of the present disclosure.

FIG. 7 is a structural diagram of a WLAN association device according to an embodiment of the present disclosure. The device includes a receiving module 702, a selection module 704, and a sending module 706.

The receiving module 702 is configured to receive multiple association requests. The multiple association requests are from at least two small APs, and the multiple association requests have a same BSSID.

The selection module 704 is configured to select one association request from the multiple association requests as a to-be-replied association request.

The sending module 706 is configured to send a first association response to a to-be-associated small AP. The first association response is a reply to the to-be-replied association request, and the to-be-associated AP is a small AP in the at least two small APs that sends the to-be-replied association request.

The device may further include a configuration module (not shown).

For implementation details of each module, refer to details of the WLAN association method shown in FIG. 5.

Persons of ordinary skill in the art may understand that all or some steps in the foregoing method embodiments may be implemented by a program instructing a processor. The program may be stored in a computer readable storage medium. The storage medium may be a random access memory, a read-only memory, a flash memory, a hard disk, a solid state disk, a magnetic tape, a floppy disk, an optical disc, or any combination thereof.

The foregoing descriptions are merely examples of specific implementations of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A wireless local area network (WLAN) association method, implemented by an access point (AP) controller coupled to a plurality of APs, wherein the WLAN association method comprises:
   receiving, by the AP controller prior to association of a user terminal, a plurality of association requests of the user terminal, wherein the plurality of association requests are from at least two APs, wherein the plurality of association requests have a same basic service set identifier (BSSID), and wherein a combination of the AP controller and the APs implements a function of a wireless AP;
   comparing, by the AP controller based on one or more of order of receipt of the plurality of association requests or signal strength of the plurality of association requests, a portion of the plurality of association requests received within a time period;
   selecting, by the AP controller based on the comparison, only one association request from the portion of the plurality of association requests as a to-be-replied association request; and
   sending, by the AP controller, a first association response to a to-be-associated AP, wherein the to-be-associated AP is in the at least two APs, and wherein the first association response indicates that a WLAN association between the user terminal and the WLAN is allowed.

2. The WLAN association method of claim 1, wherein either the plurality of association requests have a same transmitter address, or values of Sequence Control fields of the plurality of association requests are the same.

3. The WLAN association method of claim 1, wherein the plurality of association requests belong to a plurality of association request sets, wherein each association request set in the plurality of association request sets comprises at least one association request, and wherein any two association request sets in the plurality of association request sets are from different ones of the user terminals.

4. The WLAN association method of claim 1, wherein selecting the only one association request as the to-be-replied association request comprises selecting a first received association request in the plurality of association requests as the to-be-replied association request.

5. The WLAN association method of claim 1, wherein selecting the only one association request as the to-be-replied association request comprises:
    obtaining respective signal strength of the plurality of association requests measured by the at least two APs; and
    selecting an association request in the plurality of association requests having a maximum signal strength as the to-be-replied association request.

6. The WLAN association method of claim 1, wherein selecting the one association request as the to-be-replied association request comprises:
    obtaining respective signal strength of the plurality of association requests measured by the at least two APs; and
    selecting an association request in the plurality of association requests that has maximum signal strength as the to-be-replied association request, and
    wherein the WLAN association method further comprises:
        sending, by the AP controller, a first received association request to a WLAN controller after receiving the first received association request, wherein the first received association request is a first received association request in the plurality of association requests; and
        receiving, by the AP controller, a second association response from the WLAN controller, wherein the second association response is a reply to the first received association request received by the AP controller.

7. The WLAN association method of claim 3, wherein selecting the only one association request as the to-be-replied association request comprises:
    obtaining respective signal strength of the plurality of association requests measured by the at least two APs; and
    selecting an association request in a first received association request set and having maximum signal strength as the to-be-replied association request, wherein the first received association request set is a set, in the plurality of association request sets, to which first received association requests belong, and wherein the first received association requests are first received association requests in the plurality of association requests.

8. The WLAN association method of claim 7, further comprising:
    sending, by the AP controller, the first received association requests to a WLAN controller after receiving the first received association requests; and
    receiving, by the AP controller, second association responses from the WLAN controller, wherein the second association responses are replies to the first received association requests received by the AP controller.

9. The WLAN association method of claim 1, further comprising:
    obtaining, by the AP controller, identifiers of a plurality of radio frequency (RF) circuits, wherein the identifiers of the plurality of RF circuits separately identify RF circuits in a plurality of APs, wherein the plurality of APs comprise the at least two APs, and wherein each AP in the plurality of APs comprises at least one RF circuit;
    recording, by the AP controller, a mapping from the identifiers of the plurality of RF circuits to the plurality of APs;
    sending, by the AP controller, the identifiers of the plurality of RF circuits to a WLAN controller;
    receiving, by the AP controller, respective configurations of the plurality of RF circuits from the WLAN controller, wherein each configuration in the respective configurations of the plurality of RF circuits comprises an identifier of a corresponding RF circuit; and
    separately sending, by the AP controller, each configuration in the respective configurations of the plurality of RF circuits to the plurality of APs according to the mapping from the identifiers of the plurality of RF circuits to the plurality of APs.

10. The WLAN association method of claim 1, further comprising:
    obtaining, by the AP controller, identifiers of a plurality of radio frequency (RF) circuits and respective operating frequency bands of the plurality of RF circuits, wherein the identifiers of the plurality of RF circuits separately identify RF circuits in a plurality of APs, wherein the plurality of APs comprise the at least two APs, and wherein each AP in the plurality of APs comprises at least one RF circuit;
    generating, by the AP controller, a virtual identifier for RF circuits having a same operating frequency band;
    recording, by the AP controller, a first mapping and a second mapping, wherein the first mapping is a mapping from the identifiers of the plurality of RF circuits to the plurality of APs, wherein the second mapping is a mapping from the identifiers of the plurality of RF circuits to at least one virtual identifier, wherein each virtual identifier in the at least one virtual identifier corresponds to RF circuits having a same operating frequency band in the plurality of RF circuits, and wherein RF circuits corresponding to different virtual identifiers have different operating frequency bands;
    sending, by the AP controller, the at least one virtual identifier to a WLAN controller;
    receiving, by the AP controller, at least one configuration corresponding to the at least one virtual identifier from the WLAN controller, wherein each configuration in the at least one configuration comprises a corresponding virtual identifier; and
    separately sending, by the AP controller, respective configurations of the plurality of RF circuits to the plurality of APs according to the first mapping and the second mapping, wherein the RF circuits having a same operating frequency band in the plurality of RF circuits have a same configuration.

11. An access point (AP) controller coupled to a plurality of APs, wherein the AP controller comprises:
    a communications interface; and
    a processor coupled to the communications interface and configured to:
        receive, from at least two APs via the communications interface prior to association of a user terminal, a plurality of association requests of the user terminal, wherein the plurality of association requests have a same basic service set identifier (BSSID), wherein the AP controller implements a non-real-time media access control (MAC) function, and wherein the APs implement a real-time MAC function and a function of a PHY layer;

compare, based on one or more of order of receipt of the plurality of association requests or signal strength of the plurality of association requests, a portion of the plurality of association requests received within a time period starting when the AP controller receives a first one of the plurality of association requests on which comparison has not been performed;

select, based on the comparison, only one association request from the portion of the plurality of association requests as a to-be-replied association request; and send a first association response to a to-be-associated AP using the communications interface, wherein the to-be-associated AP is in the at least two APs, and wherein the first association response indicates that a WLAN association between the user terminal and a WLAN is allowed.

12. The AP controller of claim 11, wherein the AP controller completes a function of a data link layer of WLAN and each of the APs completes a function of a physical layer of WLAN, and wherein either the plurality of association requests have a same transmitter address, or values of Sequence Control fields of the plurality of association requests are the same.

13. The AP controller of claim 11, wherein the AP controller completes a function of a non-real time media access control (MAC) function of WLAN and each of the APs completes a real-time MAC function and a function of a physical layer of WLAN, wherein the non-real-time MAC function is a MAC sublayer function that has a low requirement for processing duration, wherein the real-time MAC function is a MAC sublayer function that has a high requirement for processing duration, wherein the plurality of association requests belong to a plurality of association request sets, wherein each association request set in the plurality of association request sets comprises at least one association request, and wherein any two association request sets in the plurality of association request sets are from different ones of the user terminals.

14. The AP controller of claim 11, wherein the processor is further configured to select a first received association request in the plurality of association requests as the to-be-replied association request.

15. The AP controller of claim 11, wherein the processor is further configured to:
obtain respective signal strength of the plurality of association requests measured by the at least two APs; and
select an association request in the plurality of association requests having a maximum signal strength as the to-be-replied association request.

16. The AP controller of claim 11, wherein the processor is further configured to:
obtain respective signal strength of the plurality of association requests measured by the at least two APs;
select an association request in the plurality of association requests having a maximum signal strength as the to-be-replied association request;
send a first received association request to the WLAN controller using the communications interface after receiving the first received association request, wherein the first received association request is in the plurality of association requests; and
receive, using the communications interface, a second association response from the WLAN controller, wherein the second association response is a reply to the first received association request received by the AP controller.

17. The AP controller of claim 13, wherein the processor is further configured to:
obtain respective signal strength of the plurality of association requests measured by the at least two APs; and
select an association request in a first received association request set and having a maximum signal strength as the to-be-replied association request, wherein the first received association request set is a set, in the plurality of association request sets, to which first received association requests belong, and wherein the first received association requests are first received association requests in the plurality of association requests.

18. The AP controller of claim 17, wherein the processor is further configured to:
send the first received association requests to a WLAN controller using the communications interface after receiving the first received association requests; and
receive, using the communications interface, second association responses from the WLAN controller, wherein the second association responses are replies to the first received association requests received by the AP controller.

19. The AP controller of claim 11, wherein the processor is further configured to:
obtain identifiers of plurality of radio frequency (RF) circuits, wherein the identifiers of the plurality of RF circuits separately identify RF circuits in a plurality of APs, wherein the plurality of APs comprise the at least two APs, and wherein each AP in the plurality of APs comprises at least one RF circuit;
record a mapping from the identifiers of the plurality of RF circuits to the plurality of APs;
send the identifiers of the plurality of RF circuits to a WLAN controller using the communications interface;
receive, using the communications interface, respective configurations of the plurality of RF circuits from the WLAN controller, wherein each configuration in the respective configurations of the plurality of RF circuits comprises an identifier of a corresponding RF circuit; and
separately send each configuration in the respective configurations of the plurality of RF circuits to the plurality of APs according to the mapping from the identifiers of the plurality of RF circuits to the plurality of APs using the communications interface.

20. The AP controller of claim 11, wherein the processor is further configured to:
obtain identifiers of a plurality of radio frequency (RF) circuits and respective operating frequency bands of the plurality of RF circuits, wherein the identifiers of the plurality of RF circuits separately identify RF circuits in a plurality of APs, wherein the plurality of APs comprise the at least two APs, and wherein each AP in the plurality of APs comprises at least one RF circuit;
generate a virtual identifier for RF circuits having a same operating frequency band;
record a first mapping and a second mapping, wherein the first mapping is a mapping from the identifiers of the plurality of RF circuits to the plurality of APs, wherein the second mapping is a mapping from the identifiers of the plurality of RF circuits to at least one virtual identifier, wherein each virtual identifier in the at least one virtual identifier corresponds to RF circuits having a same operating frequency band in the plurality of RF circuits, and wherein RF circuits corresponding to different virtual identifiers have different operating frequency bands;

send the at least one virtual identifier to a WLAN controller using the communications interface;

receive, using the communications interface, at least one configuration corresponding to the at least one virtual identifier from the WLAN controller, wherein each configuration in the at least one configuration comprises a corresponding virtual identifier; and separately send respective configurations of the plurality of RF circuits to the plurality of APs according to the first mapping and the second mapping using the communications interface, wherein the RF circuits having the same operating frequency band in the plurality of RF circuits have a same configuration.

21. The WLAN association method of claim 1, wherein the AP controller completes a function of a data link layer of WLAN and each of the APs completes a function of a physical layer of WLAN.

22. The WLAN association method of claim 1, wherein the AP controller completes a function of a non-real time media access control (MAC) function of WLAN, wherein each of the APs completes a real-time MAC function and a function of a physical layer of WLAN, wherein the non-real-time MAC function is a MAC sublayer function that has a low requirement for processing duration, and wherein the real-time MAC function is a MAC sublayer function that has a high requirement for processing duration.

* * * * *

UNITED STATES PATENT AND TRADEMARK OFFICE
CERTIFICATE OF CORRECTION

PATENT NO. : 11,019,558 B2
APPLICATION NO. : 15/792293
DATED : May 25, 2021
INVENTOR(S) : Yungui Wang and Lin Zhang It is certified that error appears in the above-identified patent and that said Letters Patent is hereby corrected as shown below:

In the Claims

Claim 1, Column 18, Line 38: "by the AP controller prior to association of a" should read "by the AP controller from at least two APs prior to association of a"

Claim 1, Column 18, Lines 41-45: "requests are from at least two APs, wherein the plurality of association requests have a same basic service set identifier (BSSID), and wherein a combination of the AP controller and the APs implements a function of a wireless AP;" should read "requests have a same basic service set identifier (BSSID), and wherein the AP controller implements a non-real-time media access control (MAC) function, and wherein the APs implement a real-time MAC function and a function of a PHY layer;"

Claim 1, Column 18, Line 50: "received within a time period;" should read "received within a time period starting when the AP controller receives a first one of the plurality of association requests on which comparison has not been performed;"

Claim 13, Column 21, Lines 32-36: "of claim 11, wherein the AP controller completes a function of a non-real time media access control (MAC) function of WLAN and each of the APs completes a real-time MAC function and a function of a physical layer of WLAN, wherein the non-real time MAC" should read "of claim 11, wherein the non-real time MAC"

Claim 22, Column 24, Lines 8-12: "of claim 1, wherein the AP controller completes a function of a non-real time media access control (MAC) function of WLAN, wherein each of the APs completes a real-time MAC function and a function of a physical layer of WLAN, wherein the non-" should read "of claim 1, wherein the non-"

Signed and Sealed this
Twentieth Day of July, 2021

Drew Hirshfeld
*Performing the Functions and Duties of the
Under Secretary of Commerce for Intellectual Property and
Director of the United States Patent and Trademark Office*